US012706794B2

(12) United States Patent
Wang et al.

(10) Patent No.: US 12,706,794 B2
(45) Date of Patent: Aug. 11, 2026

(54) METHOD AND ARRANGEMENTS FOR SUPPORTING SERVING OF MULTIPLE WIRELESS DEVICES BASED ON PREDICTION OF RADIO CHANNEL ESTIMATION ACCURACY DEGREDATION

(71) Applicant: Telefonaktiebolaget LM Ericsson (publ), Stockholm (SE)

(72) Inventors: Zhao Wang, Täby (SE); Rikke Apelfröjd, Knivsta (SE); Wei Zhou, Staffanstorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/717,428

(22) PCT Filed: Dec. 22, 2021

(86) PCT No.: PCT/CN2021/140558
§ 371 (c)(1),
(2) Date: Jun. 7, 2024

(87) PCT Pub. No.: WO2023/115398
PCT Pub. Date: Jun. 29, 2023

(65) Prior Publication Data
US 2025/0030589 A1 Jan. 23, 2025

(51) Int. Cl.
*H04L 27/26* (2006.01)
*H04L 25/02* (2006.01)
*H04W 72/1263* (2023.01)

(52) U.S. Cl.
CPC ...... *H04L 27/2656* (2013.01); *H04L 25/0204* (2013.01); *H04W 72/1263* (2013.01)

(58) Field of Classification Search
CPC ........... H04L 27/2656; H04L 25/0204; H04W 72/1263
See application file for complete search history.

(56) References Cited

U.S. PATENT DOCUMENTS

2013/0022021 A1 1/2013 Wild et al.
2013/0272170 A1* 10/2013 Chatterjee ............. H04W 76/19 370/280

(Continued)

FOREIGN PATENT DOCUMENTS

CN 102812646 A 12/2012
CN 103731923 A 4/2014

OTHER PUBLICATIONS

International Search Report and Written Opinion received for PCT/CN2021/140558 dated on Sep. 16, 2022.

(Continued)

*Primary Examiner* — Rahel Guarino
(74) *Attorney, Agent, or Firm* — Sonoda & Kobayashi Intellectual Property Law; Sarvajit S. Patil

(57) ABSTRACT

Methods and arrangements for supporting serving of multiple wireless devices by a radio network node of a wireless communication network. It is obtained channel estimation accuracy degradation information for at least one of the multiple wireless devices, wherein the channel estimation accuracy degradation information for respective one of the at least one wireless devices indicates a prediction of a degradation of radio channel estimation accuracy for this wireless device during TDD downlink slots. The multiple wireless devices are being scheduled in the TDD downlink slots based on the obtained channel estimation accuracy degradation information, such that the greater the predicted degradation of radio channel estimation accuracy is for a wireless device among the wireless devices, the greater influence is applied for scheduling the wireless device early among the TDD downlink slots.

20 Claims, 8 Drawing Sheets

(56) References Cited

U.S. PATENT DOCUMENTS

| | | | |
|---|---|---|---|
| 2016/0381583 | A1 | 12/2016 | Sawahashi et al. |
| 2018/0205577 | A1 | 7/2018 | Shin et al. |

OTHER PUBLICATIONS

3GPP TSG RAN WG1 Meeting #57bis, Beamforming based MU-MIMO, Los Angeles, CA, USA, 29th Jun. 29-Jul. 3, 2009.

* cited by examiner

FIG. 6

METHOD AND ARRANGEMENTS FOR SUPPORTING SERVING OF MULTIPLE WIRELESS DEVICES BASED ON PREDICTION OF RADIO CHANNEL ESTIMATION ACCURACY DEGREDATION

CROSS-REFERENCE TO RELATED APPLICATIONS

This patent application is a submission under 35 U.S.C. § 371 for U.S. national stage patent application of international application no. PCT/CN2021/140558 filed on Dec. 22, 2021 and entitled "METHOD AND ARRANGEMENTS FOR SUPPORTING SERVING OF MULTIPLE WIRELESS DEVICES BASED ON PREDICTION OF RADIO CHANNEL ESTIMATION ACCURACY DEGREDATION," the entirety of which is incorporated herein by reference.

TECHNICAL FIELD

Embodiments herein concern method and arrangements for supporting serving of multiple wireless devices by a radio network node of a wireless communication network, where said serving is performed using Time Division Duplex, TDD, over a frequency carrier and wherein the radio network node is configured to, for each of said wireless devices, estimate a downlink radio channel of the wireless device based on reference signals transmitted by the wireless device in TDD uplink slots with TDD downlink slots therebetween.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", "gNB", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) may be used for the transmission path from the base station to the wireless device. The expression uplink (UL) may be used for the transmission path in the opposite direction i.e. from the wireless device to the base station.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

3GPP has specified and development work has continued with a fifth generation (5G) of wide area wireless communication networks, and even development with a further generation has begun.

Beamforming is e.g. used in multiple-input-multiple-output (MIMO) communication, which is a technique to serve several users simultaneously with the same time and frequency resource in a wireless communication network. This technique, in which the gNB and/or the UEs are equipped with multiple antennas, enables spatial diversity when transmitting data in both uplink (UL) and downlink (DL) directions. The obtained spatial diversity increases the capacity of the network dramatically, or equivalently one can say that it offers a more efficient utilization of the frequency spectrum. Moreover, MIMO can reduce the inter-cell and intra-cell interferences which in turn, leads to more frequency re-use. As the electromagnetic spectrum is a rare resource, MIMO is a solution for the extension of the capacity of wireless communication systems.

Relevant for effective deployment of MIMO communication technology is access to channel responses, or estimates thereof, between the gNB and the UEs in the associated network cell. Such estimates of channel responses is often named, or in the form of, so called Channel State Information (CSI). The channel responses are both for DL and UL transmissions and are e.g. used to help forming the beam from the gNB towards the intended UEs. The channel in the UL direction is usually estimated using pilot symbols, i.e reference signals, sent by the UEs and received by the gNB. These symbol or signals as often referred to as "sounding" and are for example implemented as Sounding Reference Symbols (SRS) in 3GPP LTE and NR.

For a time division duplex (TDD) based system, it is possible to apply the physical channel property of reciprocity and use the UL sounding and channel estimation to obtain the DL channel estimates. The DL channel estimates, consequently, can be used to calculate the weight for beamforming by e.g. a gNB. In fact, reciprocity-based algorithms for beamforming in the downlink are amongst the most successfully exploited algorithms in MIMO and are predicted to be widely exploited in 5G. This class of algorithms are applicable whenever the so-called channel reciprocity holds. More precisely, they assume that the channel frequency response between two antennas in the uplink is the same as the channel frequency response in the downlink multiplied by a constant complex scalar. Based on this assumption, they use the estimated channel in the uplink direction for beamforming in the downlink. This principle at least holds when time-division multiplexing is used for sharing data transmission time between the DL and UL transmissions.

Multi user MIMO (MU-MIMO) is a technique where several users, i.e. UEs, are served by the same transmit antennas within the same time-frequency resources. Since the gNB here transmits data to more than one UE within the same resources, the UEs will receive not only their own data, but also interference in form of the data to the other users. Precoding techniques can be used to mitigate this interference while increasing the energy of the desired data at each UE and thus achieving high spectral efficiency for MU-MIMO systems. For these techniques to work, high accuracy of channel knowledge is typically required to design efficient beamforming solutions.

SUMMARY

In view of the above, an object is to enable or provide one or more improvements or alternatives in relation to the prior art, such as to support or facilitate usage of MU-MIMO in wireless communication networks, in particular 3GPP NR based networks.

According to a first aspect of embodiments herein, the object is achieved by a method, performed by one or more network nodes, for supporting serving of multiple wireless devices by a radio network node of a wireless communication network. Said serving to be performed using TDD over a frequency carrier. The radio network node being configured to, for each of said wireless devices, estimate a downlink radio channel of the wireless device based on reference signals transmitted by the wireless device in TDD uplink slots with TDD downlink slots therebetween. Said one or more network nodes obtain channel estimation accuracy degradation information for at least one of said multiple wireless devices. Said channel estimation accuracy degradation information for respective one of said at least one wireless devices indicates a prediction of a degradation of radio channel estimation accuracy for that wireless device during TDD downlink slots. The one or more network nodes then performs scheduling of said multiple wireless devices in said TDD downlink slots based on the obtained channel estimation accuracy degradation information. The scheduling is performed such that the greater the predicted degradation of radio channel estimation accuracy is for a wireless device among said wireless devices, the greater influence is applied for scheduling the wireless device early among said TDD downlink slots.

According to a second aspect of embodiments herein, the object is achieved by a computer program comprising instructions that when executed by one or more processors causes one or more network nodes to perform the method according to the first aspect.

According to a third aspect of embodiments herein, the object is achieved by a carrier comprising the computer program according to the second aspect.

According to a fourth aspect of embodiments herein, the object is achieved by one or more network nodes for supporting serving of multiple wireless devices by a radio network node of a wireless communication network. Said serving to be performed using TDD over a frequency carrier. The radio network node being configured to, for each of said wireless devices, estimate a downlink radio channel of the wireless device based on reference signals transmitted by the wireless device in TDD uplink slots with TDD downlink slots therebetween. Said one or more network nodes are configured to obtain channel estimation accuracy degradation information for at least one of said multiple wireless devices. Said channel estimation accuracy degradation information for respective one of said at least one wireless devices indicates a prediction of a degradation of radio channel estimation accuracy for that wireless device during TDD downlink slots. The one or more network nodes are further configured to perform scheduling of said multiple wireless devices in said TDD downlink slots based on the obtained channel estimation accuracy degradation information. The scheduling is performed such that the greater the predicted degradation of radio channel estimation accuracy is for a wireless device among said wireless devices, the greater influence is applied for scheduling the wireless device early among said TDD downlink slots.

Thanks to embodiments herein and said influence applied for the scheduling based on the predicted degradations of radio channel estimation accuracies for the wireless devices, channel estimations, e.g. in the form of CSI, will be more accurate than else would be the case for wireless devices where the degradation would be most problematic, e.g. for wireless devices at high speed that without embodiments herein would be more likely to be scheduled later among the TDD downlink slots. Thereby serving of these wireless devices using MU-MIMO and beamforming is supported and facilitated.

The technology presented in the present application utilizes the predicted degradations of radio channel estimation accuracy in the scheduling of the wireless devices, more specifically for determination of when wireless devices are to be scheduled in the downlink, i.e. for determining the timing of scheduling the wireless devices. Thereby wireless devices with great degradation of channel estimation accuracy, i.e. the wireless devices for which the channel estimation to be used gets bad faster, can be scheduled sooner, e.g. shortly after the channel has been estimated in the uplink. An advantage thereby, at least for the embodiments, is improved chances of communicating with these wireless devices by MU-MIMO and beamforming in a TDD operated system. For example, also wireless devices travelling at high speed may be served by MU-MIMO, and/or by beamforming. Thereby these wireless devices may benefit of extended range of communication services, that requires high data rates.

BRIEF DESCRIPTION OF THE DRAWINGS

Examples of embodiments herein are described in more detail with reference to the appended schematic drawings, which are briefly described in the following.

FIG. 6 is another combined signaling diagram and flowchart for describing and discussing some examples and embodiments herein and related actions.

DETAILED DESCRIPTION

Figure 1A:
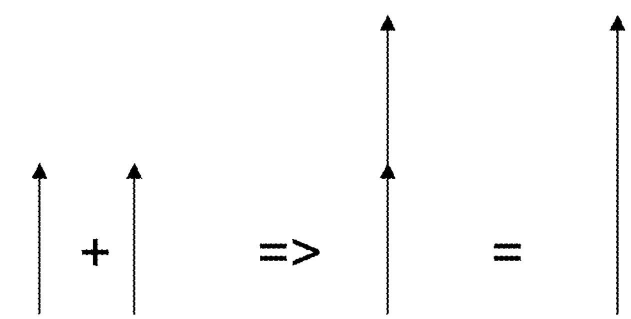
FIGS. 1A-D schematically illustrate the principle of MIMO beamforming and interference cancellation when two channels are involved.

Throughout the following description similar reference numerals may be used to denote similar elements, units, modules, circuits, nodes, parts, items or features, when applicable. Features that appear only in some embodiments are, when embodiments are illustrated in a figure, typically indicated by dashed lines.

Embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As part of the development of embodiments herein, the situation indicated in the Background will first be further elaborated upon.

In practice, UEs with similar channel conditions are normally paired together by a gNB for MU-MIMO transmission. This may mean that the signal power intended for each UE are at the same level, such that interference may be the main limitation for DL throughput.

FIGS. 1A-D schematically illustrate the principle of MIMO beamforming and interference cancellation when two channels are involved. The figures show four different situations, respectively. It is exemplifies the principle of combining two channel vectors to achieve beamforming (FIGS. 1A-B) and interference cancellation (FIGS. 1C-D) with and without channel estimation errors.

In FIG. 1A a situation with perfect knowledge of the channel, e.g. through perfect CSI, and maximum beamforming gain is possible. In other words, beamforming gain with perfect CSI.

Figure 1B:
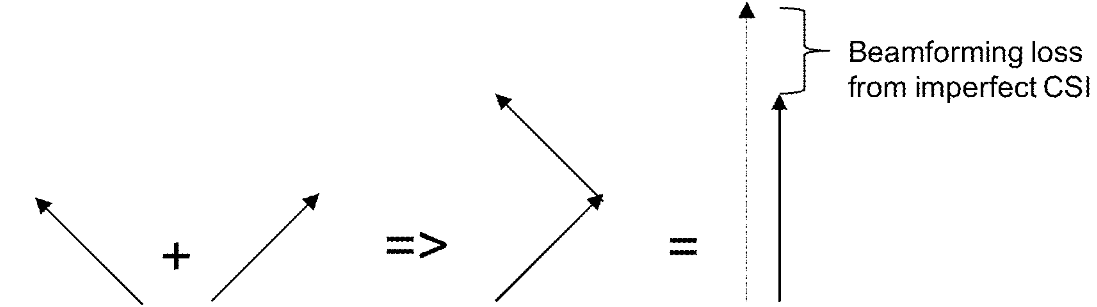

In FIG. 1B there is an error, e.g. due to imperfect CSI, with 45 degree error on both channels with a total 90 degree relative error, resulting in a beamforming loss if compared to the situation in FIG. 1A. This may be described as there being a beamforming gain with CSI with 45° angular error on both channels.

Figure 1C:
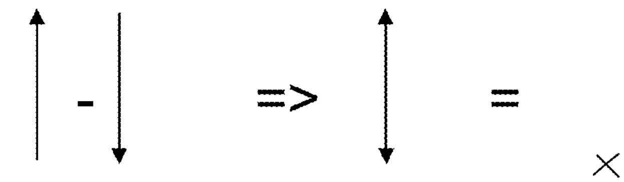

In FIG. 1C it is shown impact on interference cancellation when there is perfect knowledge of the channel, e.g. through perfect CSI, and the interference is cancelled out. In other words, an example of interference cancelation with perfect CSI.

Figure 1D:
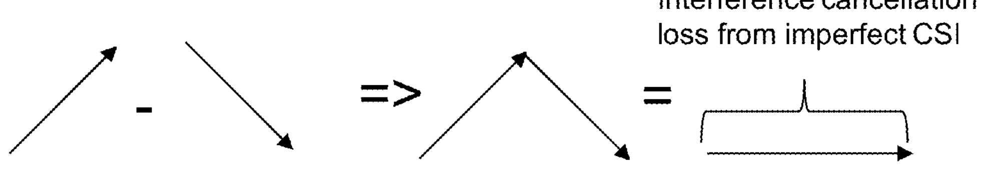

In FIG. 1D there is 45 degree angular error on both channels and interference cancellation is less successful, and there is a relative large interference cancellation loss. The shown situation may be described as interference cancellation with CSI with 45° angular error on both channels.

It should be noted and can be understood from the schematic figures that there can be a larger relative change, as illustrated in FIGS. 1C-D, for interference cancellation with perfect and imperfect CSI, respectively, compared to the case with beamforming gain as in FIGS. 1A-B. This illustrates why channel accuracy, i.e. good knowledge of the channel, is especially crucial for MU-MIMO as compared to single user MIMO (SU-MIMO) where only the beamforming gain is required.

Herein, the terms CSI (channel state information) and channel estimation may be used interchangeably. As used herein both expression may refer to an estimate of a complex channel gain between a radio network node, such as a base station, and a wireless device within a time-frequency resource used for communication between the radio base station and the wireless device. Such time-frequency resource may for example be so called resource element, i.e. a single subcarrier times a single OFDM-symbol, or it may be one or more physical resource blocks (PRB), each that may consist of 12 adjacent subcarriers, times one or more time slots, e.g. corresponding to 14 OFDM symbols. A channel estimate for a certain time period, i.e. that is used as estimation of the channel for that time period, may:

- be based on current measurements, i.e. measurements that are collected during said time period, or
- be based on past measurements only, in which case the channel estimate may be referred to as a channel prediction, since it is for a time period that occurs after the measurements, or
- be based on current, past and future measurements, in which case it may be referred to as a smoothed estimate.

When the term CSI is used herein, it may refer to information that in addition to the channel estimate also includes information about the accuracy of the channel estimate. It should be noted that the use of CSI is typically not exactly the same definition of CSI as used in a specific standard, e.g. by 3GPP, in for example 5G standard specification, where CSI is often used to describe specific information of the channel that is exchanged between user and base station, i.e. between wireless device and radio network node.

Even though it is possible to obtain the CSI based on channel reciprocity from uplink channel estimation, two things have great impact of the CSI accuracy: the first is the quality of the channel estimation algorithm given the channel conditions and quality of the measurement(s) used for channel estimation, which is reflected by the channel estimation error that would occur if the user was stationary, the second is UE mobility. When the UE is moving, the channel will change such that, the further the UE has moved between sending the uplink reference signals, upon which the channel estimation was based, and the base station using said channel estimate to transmit data to the UE, the less accurate the channel estimation typically becomes.

The estimation of the channel based on uplink sounding may decrease in accuracy when applied by a downlink precoder for precoding downlink data at transmission in some slot later than that in which the sounding signal is received. As a result, the channel estimate for the downlink may be associated with an error than negatively impacts beamforming in MU-MIMO.

TDD Frame Structure

In Time Divisional Duplex, TDD, in downlink, DL, and uplink, UL communication directions are shared on the same frequency carrier based on time domain multiplexing. The distribution of slots for respectively the UL and the DL is referred to as TDD pattern, and there are different alternatives. As already indicated above, one UL or DL slot may correspond to the duration of 14 OFDM symbols. In some alternatives there are several consecutive DL slots between two UL slots. The accuracy of the channel estimate for a DL slot decreases, with its distance from the UL slot in which the sounding reference signal was received and which is the basis for the channel estimate. The decrease in the accuracy also depends on other factors, such as the radio environment and the speed of the UE as already indicated above.

Figure 2:
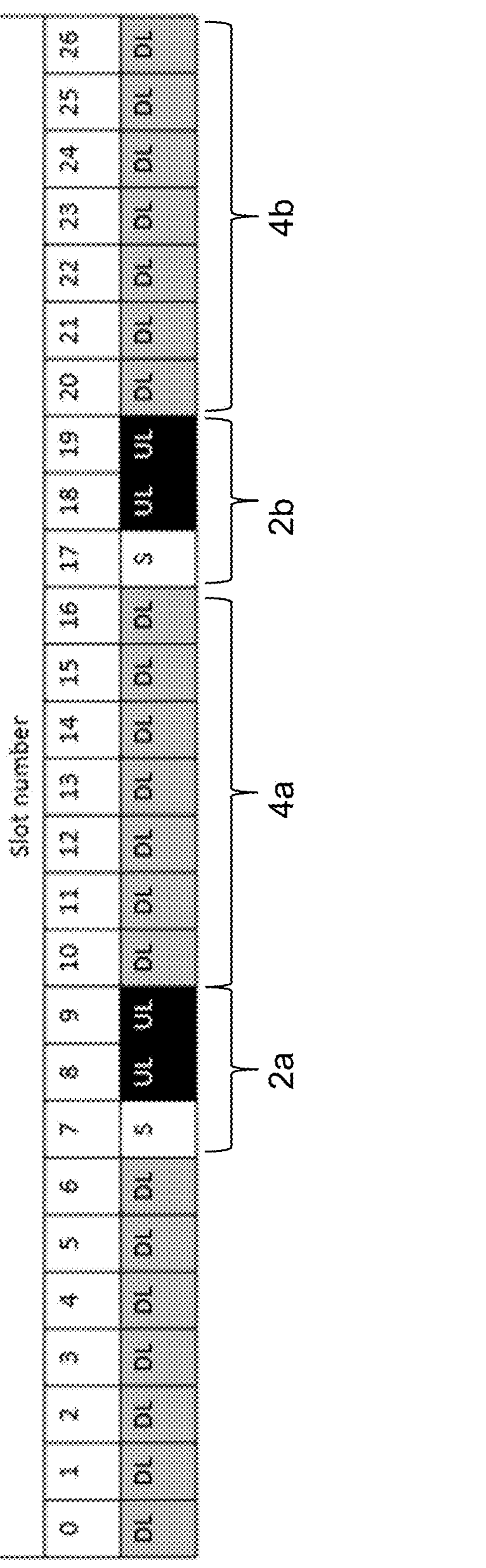
FIG. 2 schematically shows an example of a TDD pattern of slots in uplink and downlink communication directions.

FIG. 2 schematically shows an example of a TDD pattern. Here, slots 7,8,9 are uplink slots 2*a* possible for uplink channel estimation, and it is assumed in the figure that reference signal(s) for such estimation is transmitted in UL symbol(s) of slot 7, as indicated by S in the figure. The slot exemplified as S may be considered an uplink slot in the context of embodiments herein although it may be referred to as a special slot in some circumstances. The reference signal(s) can also be transmitted in an ordinary UL slot. After the uplink slots there are downlink slots 4*a* for which the estimated channel to some extent will be less accurate for, i.e. the channel estimate accuracy has decreased. These DL slots are indexed by 10 to 16. The outdating will typically become increasingly more severe as time passes, i.e. while the outdating may be tolerable for the slot index 10, by slot index 16, the estimated CSI may be impossible to use with any good result for MU-MIMO. After the DL slots 4 there are further UL slots 2*b,* here corresponding to number and sequence of UL slots 2*b* with reference signal(s) assumed transmitted in UL slot indexed 17, and thereafter again downlink slots 4*b,* etc, i.e. there may be a repetitive pattern.

SRS Configurations with Large SRS Transmission Periodicity

When the number of UEs that need to transmit SRS signal is large, all UEs may not be configured to transmit SRS signal during a single uplink transmission occasion, due to the large overhead that would cause. The reason is that the SRS transmission capacity of each uplink transmission occasion is limited. In other words, to allow more UEs to have SRS transmission opportunities, network needs to increase the SRS transmission periodicity. As a bi-product, for each UE, SRS transmission occasions will be further spaced apart. For example, the SRS transmission periodicity may be configured as 20 milliseconds, even though there may be uplink transmission occasion every 5 ms. Hence, the risk of problematic outdating of estimated CSI increases even further.

UE in High Velocity

The extent of the severity of channel estimate outdating as explained above depends on the UE speed. If UE is stationary, then the channel is likely to remain close to constant during a long period of time and the outdating will generally not be an issue. However, when a UE is moving, the complex channel between the base station and the UE will substantially change slot by slot, which means the accuracy of the channel estimate decrease. This issue is sometimes referred to as outdating and will become more severe, especially when the UE is in high velocity and thus more problematic for UEs with higher velocity compared to UEs that are stationary or at lower velocity.

Hence, in a prevalent RAT transmission, the uplink channel estimation will be directly applied for downlink precoder calculation. However, in case a UE is at speed, the outdating of the channel estimate may degrade the RAT performance.

Due to mobility of UEs and reasons described above the higher the speed is, the greater the problem with outdating of the channel estimate becomes, and the result will be degradation of RAT performance.

To reduce negative impact from this, channel predictions can be introduced.

Figure 3:
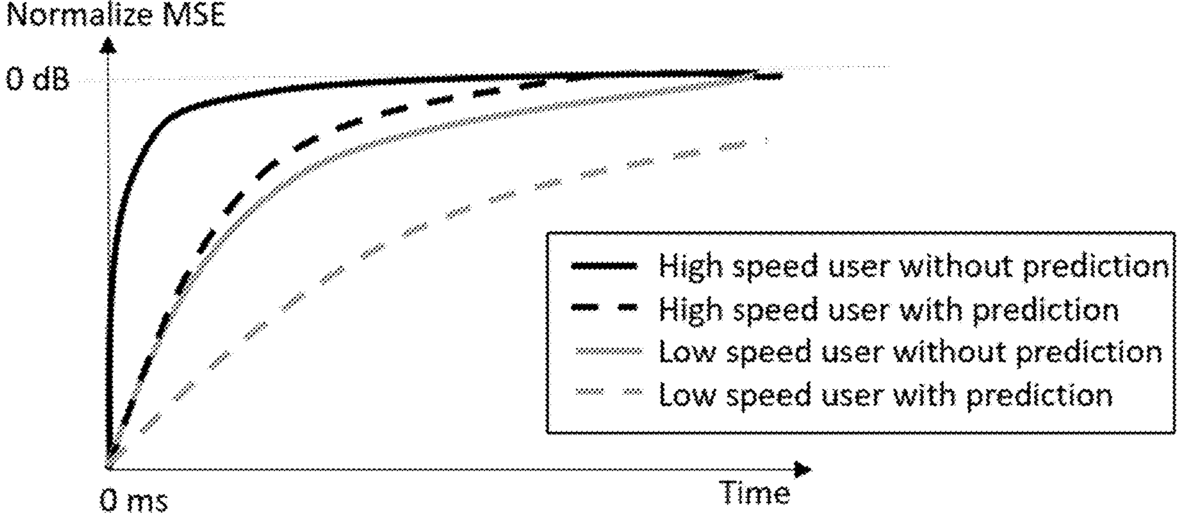
FIG. 3 schematically illustrates an example of the error of the channel estimation over time for two different UEs with similar channel conditions, but at different speeds.

FIG. 3 schematically illustrates an example of the error of the channel estimation for two different UEs with similar channel conditions, but at different speeds, named a high speed user and a low speed user. The figure provides an example of how the channel estimation error, here in the form of mean square error (MSE), may vary with time since the last received pilot symbol, here in the form of SRS. In the example, time zero represent the time when the SRS arrive. In the context of the figure, "normalize" refers to the MSE divided by an expected value of $|h(t, f)|_2$ where $h(t, f)$ is the complex channel in a slot t and subcarrier f.

It can be seen that it is possible, based on channel prediction, to improve the range for which a reasonable estimation error, here in the form of mean square error (MSE), is possible, also for high speed users. However, even with channel prediction, the MSE might still degrade too much before the next SRS is transmitted. With a well-designed channel predictor, the channel estimation error across subsequent slots will be a monotonically increasing function, i.e., the prediction quality for the earlier slots should always be better or equal to that of the later slots, given the same channel conditions, e.g. noise plus interference level.

In applications when accurate channel estimation is important, e.g. MU-MIMO, it would be desirable with a way to ensure that the UEs are scheduled in slots where the accuracy of their channel estimates are sufficiently good and the result from beamforming thereby can be good as well.

In practice, the channel estimation error is unknown due to lack of ground knowledge of the true channel. There are various ways of estimating and predicting error terms such as represented by MSE. For instance, in a commonly implemented channel estimation algorithm, the estimation error is approximated via an estimated raw Signal to Noise Ratio (SNR) scaled with an estimation denoising factor of that channel estimation algorithm. Similarly, as a generalization of channel estimation, there also exist approaches of approximating prediction errors. For example, for Gaussian process based prediction, such as Kalman filters, at every Kalman update step, there is always an approximation for the prediction error term which is needed for later update procedure.

Hence, in practise, an exact form of estimation and/or prediction error terms typically depends on the used and e.g. implemented estimation and/or prediction algorithms.

Scheduling of wireless devices is as such a well-known concept and technique. In MU-MIMO transmission a scheduler is normally applied that pairs wireless devices and assign them time-frequency resources. The scheduler's role is to find wireless devices that are spatially compatible and schedule these within the same time-frequency resources, typically in the form of physical resource blocks (PRBs) and time slots. All wireless devices that are scheduled within the same PRB will be served jointly through MU-MIMO techniques by the base station. The spatial compatibility is one out of many considerations that a scheduling algorithm will generally perform while scheduling users. That two users are spatially compatible means that it will be relatively easy to find a precoder for transmitting to these two users jointly without introducing a lot of interference from one user's data into the other user's data and vice versa. Others, just to mention some, may include, but are not limited to, latency and reliability demands of the user, spectral efficiency and power consumption in the base station, which can be lower if some slots are left empty. As an example for how scheduling and a scheduler may operate: A wireless device with high reliability constraints may be assigned more resources and a wireless device with low latency constraints be given higher priority in the scheduler. The spectral efficiency can for example be increased by scheduling users within PRBs where they have a strong channel gain. The channel gain may vary in time and frequency due to fading and frequency selectivity.

When scheduling users for MU-MIMO transmission there are solutions that take both the UEs' channel fading and the spatial compatibility of UEs into account. However, since the reliability of the CSI is not considered, the result can be that high mobility users with very good channels are scheduled in slots where their respective channel estimation error is large. For SU-MIMO this is not so severe as the beamforming gain is relatively robust to channel estimation errors, as explained above in relation to FIGS. 1A-B. In the worst case the beamforming gain will become that of non-coherent combining which is still a significant gain. For MU-MIMO on the other hand, interference cancelation is an important aspect and channel estimation errors play a significant part, as explained in relation to FIGS. 1C-D.

If it is known that the channel estimation used does not accurately represent the channel through all slots where a user is scheduled, it is likely that SU-MIMO, with users being multiplexed in frequency, would be preferable to MU-MIMO from a system performance perspective. For this reason many networks are designed to only do MU-MIMO transmission for stationary or slow moving users. This means that for medium to fast moving users, the network is unable to use the benefits of MU-MIMO. This problem may be referred to as "the curse of mobility for MU-MIMO" and it is desirable to solve or mitigate it so that high capacity offered by MU-MIMO can be used also for faster moving UEs.

Embodiments herein may be considered to relate to a more mobility friendly scheduling design to make it possible to apply MU-MIMO also for faster moving UEs. The scheduling may be referred to as a channel prediction error assisted scheduling. For MU-MIMO transmission the scheduler may schedule UEs based on a ranking. A ranking function may be used and be based on at least the degradation of each UE's channel estimation error of the slots in between two SRS receptions. Specifically, if the error of the channel estimate for a UE degrades significantly from the first DL slot after the SRS, e.g. slot number 10 in FIG. 2, to the last DL slot before the next SRS, e.g. slot number 16 in FIG. 2, then the UE is associated with a high ranking number, or higher ranking number than another UE with less degradation from slot 10 to slot 16. For example, if the difference in MSE of such other UE between these slots is low, or lower, then this UE is associated with a low, or lower, ranking number. Then, when scheduling UEs, those with higher ranking are given higher probability to be scheduled within the first few slots after the SRS transmission than those with lower ranking.

A result from such solution and embodiments herein is that spectral efficiency of the band is improved. This since high ranking users, i.e. users with greater degradation of their channel estimation, will be scheduled in DL slots adjacent, or closer, to the UL slots carrying SRS, and in which DL slots the CSI represents the DL channel good enough to enable MU-MIMO gains. These will typically be the high to medium speed users. Low speed users and stationary users will generally not suffer great throughput degradation by being scheduled in later resources, i.e. later DL slots.

Figure 4:
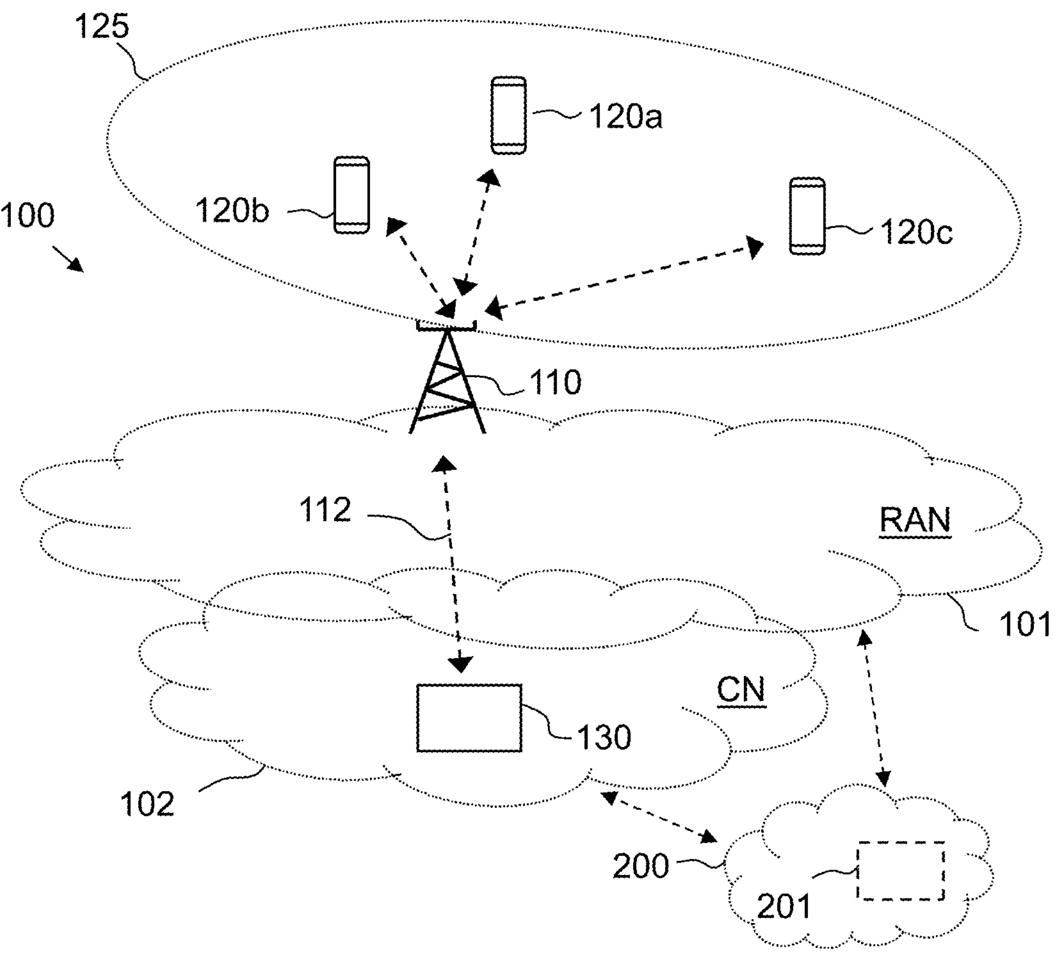
FIG. 4 is a block diagram schematically depicting a wireless communication network 100 in which embodiments herein may be implemented and utilized.

FIG. 4 is a block diagram schematically depicting a wireless communication network 100 in which embodiments herein may be implemented and utilized.

The wireless communication network 100 may comprise a Radio Access Network (RAN) 101 part and a Core Network (CN) 102 part. The wireless communication network 100 may be a telecommunication network or system, such as a cellular communication network that supports at least one Radio Access Technology (RAT), e.g. LTE, or 4G, and/or 5G, and New Radio (NR) based systems in general, including e.g. also further generations beyond 5G.

The wireless communication network 100 typically comprises network nodes that are communicatively interconnected. The network nodes may be logical and/or physical and are located in one or more physical devices. The wireless communication network 100, typically the RAN 101, comprises one or more radio network nodes, e.g. a radio network node 110 as shown in the figure. The radio network node 110, e.g. a eNB or gNB, may be or comprise radio transmitting and/or receiving device(s), such as base station(s) and/or controlling node(s) that control one or more radio transmitting and/or receiving devices. The radio network node 110 is configured to serve and/or control and/or manage one or more wireless communication devices, e.g. wireless devices 120*a*-120*c* shown in the figure. Each radio network node provide one or more radio coverages, e.g. corresponding to one or more radio coverage areas, i.e. radio coverage that enables communication with one or more wireless communication devices that it serves and/or controls and/or manages. For example, there may be a radio coverage 125 provided by the radio network node 110 for serving the wireless devices 120*a-c*. A wireless communication device may alternatively be named a wireless device and may correspond to a UE etc. as mentioned in the Background. Each radio coverage may be provided by and/or associated with a particular Radio Access Technology (RAT). A cell can be a logical entity in which wireless devices are served through radio coverage. The radio coverage may be provided simultaneously in a relative large geographical area for serving of wireless devices in that area and/or by one or more radio beams, that simply may be named beams. As should be recognized by the skilled person, a beam is a more dynamic and relatively narrow and directional radio coverage compared to how radio coverage has been provided conventionally, and may be accomplished by so called beamforming. A beam is typically for serving one or a few communication devices at the same time, and may be specifically set up for serving one or few wireless devices. The beam may be changed dynamically by beamforming to provide desirable coverage for the one or more wireless devices being served by the beam. There may be more than one beam provided by one and the same radio network node.

Said radio network nodes may be communicatively connected, such as configured to communicate, over, or via, a certain communication interface and/or communication link with each other and/or other network nodes.

Further, the wireless communication network 100, or rather the CN 102, typically comprises one or more core network nodes, e.g. a core network node 130 as shown in the figure. These may be communicatively connected to each other and other network nodes, such as configured to communicate, over, or via, a communication interface and/or communication link, with radio network nodes of the RAN 101, e.g. with the radio network node 110.

The wireless devices 120*a-c* are for communication with and via the wireless communication network 100, e.g. by being served by the wireless communication network 100 by means of one or more radio network nodes, e.g. the radio network node 110 when within its radio coverage. Radio communication between a wireless device and a radio network node of the wireless communication network typically takes part over one or more radio channels.

The figure also shows a further node 201 and a further network 200. The further node 201 may be located outside the wireless communication network 100, i.e. be an external node, as indicated in the figure, or alternatively (not indicated in the figure) be comprised in the wireless communication network 100 and thus be a network node thereof, e.g. a management node thereof. Likewise, the further network 200 may be located outside the wireless communication network 100, i.e. be an external network, as indicated in the figure, e.g. corresponding to a so-called computer cloud, often simply referred to as cloud, that may provide and/or implement services and/or functions for and/or relating to the wireless communication network 100. The further network 200 may alternatively (not indicated in the figure) be comprised in the wireless communication network 100 and thus e.g. correspond to a subnetwork thereof. It is implied that a network, e.g. an one of the wireless communication network 100 and the further network 200, comprises interconnected network nodes. The further network 200 and further node 201 may in principle be any network and network node communicatively connected to the wireless communication network, e.g. to support it in some way. The further node 201 may be comprised in the further network 200 and may then be referred to and be example of a network node of the further network 200.

Attention is drawn to that FIG. 4 is only schematic and for exemplifying purpose and that not everything shown in the figure may be required for all embodiments herein, as should be evident to the skilled person. Also, a wireless communication network or networks that correspond(s) to the wireless communication network 100, will typically comprise several further network nodes, such as further radio network nodes, e.g. base stations, network nodes, e.g. both radio and core network nodes, etc., as realized by the skilled person, but which are not shown herein for the sake of simplifying.

Figure 5:
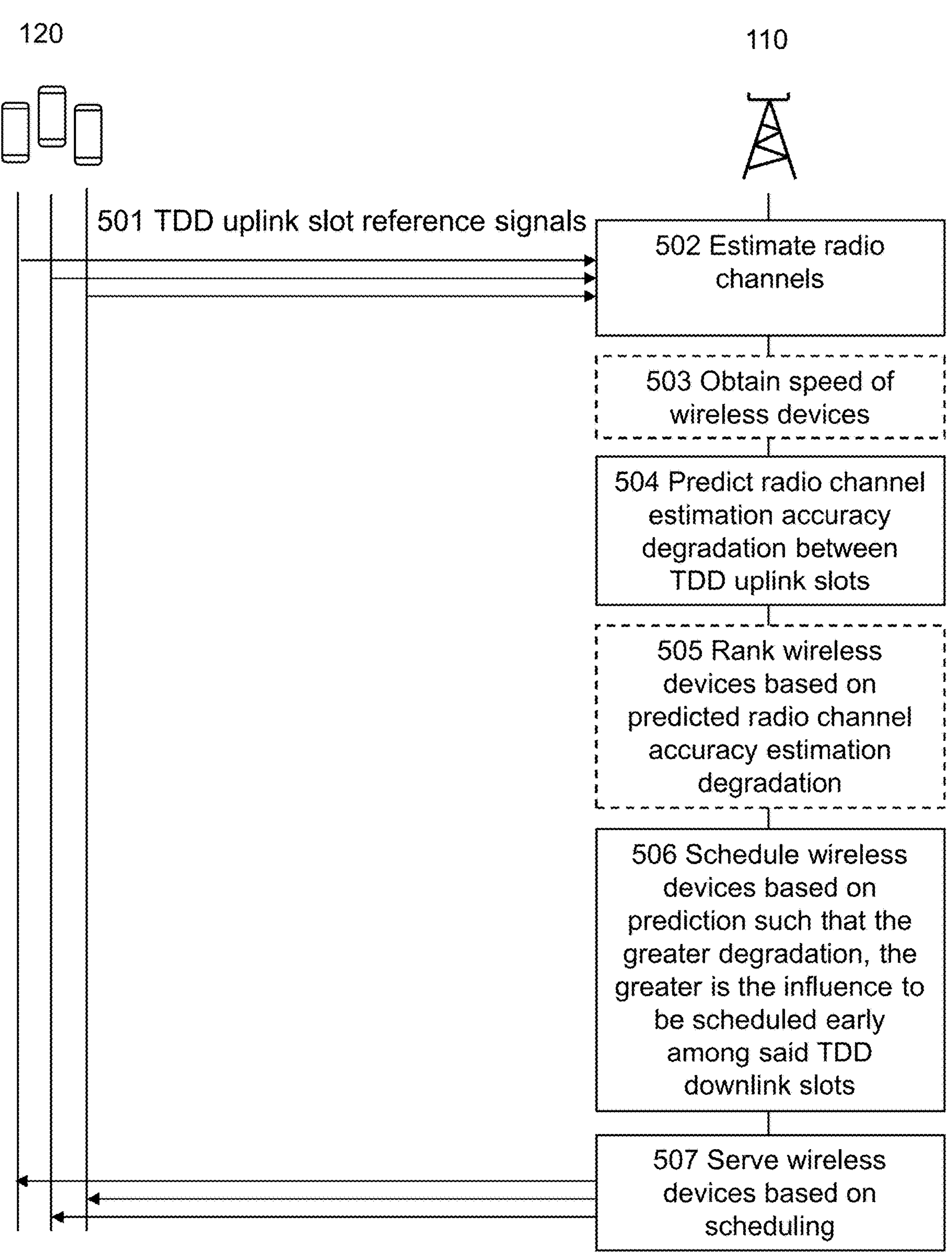
FIG. 5 is a combined signaling diagram and flowchart for describing and discussing some examples and embodiments herein and related actions.

FIG. 5 is a combined signalling diagram and flowchart for describing and discussing some examples and embodiments herein and related actions. The actions in the following and as illustrated in the figure and example are performed by the radio network node 110. The actions may be part of a method for serving or supporting serving, by the radio network node 110, of multiple wireless devices, in the present example exemplified by the wireless devices 120*a-c*. As already indicated above, the serving is performed using TDD over a frequency carrier. As also indicated above, just as in the prior art, the serving radio network node 110 is configured to, for respective wireless device 120*a-c*, estimate a downlink radio channel of the wireless device based on reference signals transmitted by the wireless device. The reference signals may thus be received by the serving radio network node 110 from the wireless devices 120*a-c* as in FIG. 2, i.e. in TDD uplink slots with TDD downlink slots therebetween, i.e. between the TDD uplink slots with reference signals. For example, reference signals, such as SRS, may be in one or more of TDD uplink slots, e.g. in a sequence of consecutive TDD uplink slots, such as in one or more of the TDD uplink slots 2*a,* and in one or more of the TDD uplink slots 2*b,* with TDD downlink slots 4 therebetween. The TDD uplink slots 2*a,* 2*b* and the TDD downlink slots 4 will be used as examples in the following.

The actions below may be taken in any suitable order and/or be carried out fully or partly overlapping in time when this is possible and suitable.

Action 501

The radio network node 110 receives said refence signals in the TDD uplink slots. The reference signals and receipt thereof may be as conventionally.

Action 502

The radio network node 110 estimates the radio channels to each of the wireless devices, respectively, based on, i.e. using, the reference signals as received from each of the wireless devices. The estimation as such may be performed as conventionally. That is, per wireless device there may be two channel estimations, one based on the reference signal in TDD uplink slots 2*a* and one based on the reference signal in TDD uplink slots 2*b*.

Action 503

The radio network node 110 may obtain the speed, or information identifying or indicating, the speed of respective wireless device 110*a-c*.

The speed of a wireless device may be a measure or estimate of current, or present speed. Information on the speed may come from a node or function in the wireless communication network 100 configured to provide such information, and/or for example result from estimations and/or measures, e.g. based on change, or estimated change, in position for each wireless device and/or based on Doppler shift information regarding radio signals from the wireless devices. If change of position is measured over a time period, an average speed for the period can be provided.

Action 504

The radio network node 110 predicts radio channel estimation accuracy degradation, i.e. degradation of the channel estimation accuracy, for respective wireless device 120*a-c*. For respective wireless device, channel estimation accuracy degradation may be predicted for a time between TDD uplink slots, i.e. a degradation that is relevant for TDD downlink slots between TDD uplink slots, such as for the TDD downlink slots 4*a* and 4*b*, and thus for the time interval, i.e. time period, between where the channel can be predicted based on the reference signals in the TDD uplink slots.

As used herein, by channel estimation accuracy, it is meant the accuracy of a channel estimate at the time it is used as estimation or prediction of an actual radio channel, e.g. by a radio network node for transmission to the wireless device, i.e. in the downlink. That is, if the channel estimate used at that time corresponds to, and thus is a good measure of, the actual channel, the accuracy is good, but if the channel estimate at that time is not, or no longer is, a good measure of the actual channel, the accuracy is bad. When a channel estimate is produced from measurements on a channel it can be considered an estimate of a current channel and the channel estimate is typically good, but over time the same channel estimate typically becomes an increasingly less good measure of the then current channel, i.e. there is a degradation or deterioration of the channel estimation accuracy. Hence, as used herein, by degradation or deterioration of a channel estimate accuracy between two points in time, it is meant that a channel estimate used at the later point in time is a less accurate measure of the channel than a channel estimate at the earlier point in time.

In some embodiments, the same channel estimate, e.g. a channel estimate made on a reference signal in a TDD uplink slot, e.g. one of the TDD uplink slots 2*b*, is used for all TDD downlink slots thereafter e.g. the TDD downlink slots 4*b*, and channel estimates thus typically becomes increasingly less accurate during the TDD downlink slots, i.e. during the time period of the TDD downlink slots, e.g. the TDD downlink slots 4*b*.

In other embodiments, a model based channel prediction is used, i.e. there is a model for how the radio channel changes over time that is applied to estimate the channel. Still, also in this case, when the model is applied on the downlink to estimate the downlink channel and it is based on a channel estimate on the uplink that has been made on a reference signal in an earlier TDD uplink slot, e.g. one of the TDD uplink slots 4*b*, the model will typically provide less accurate channel estimates for later TDD downlink slots than earlier ones, e.g. less accurate when the model is used for TDD downlink slot 26 than for downlink slot 20 of the TDD downlink slots 4*b*. This is typically the case even if the model based prediction, as such, provides better estimates than as in the other case mentioned in the forgoing paragraph.

The above indicated two ways of estimating the downlink channel and the difference between them are explained and exemplified further below.

In some embodiments the predicted radio channel estimation accuracy degradation of Action 504 is based on a difference between channel estimations using reference signals in two TDD uplink slots separated by TDD downlink slots. For example, with reference to the TDD frames example of FIG. 2, channel estimation based on reference signals received in slots with indexes 7 and 17, i.e. of TDD uplink slots 4*a*, 4*b*, may be used to predict a radio channel estimation accuracy degradation, or rather a degradation trend or degradation behavior between these slots, i.e. over time, for the TDD downlink slots 4*a* and it can be assumed that the degree of degradation is also applicable for TDD downlink slots 4*b*. For example, assume that reference signals in TDD uplink slots with 7 and 17 for wireless device 120*a* are used to provide the two radio channel estimations for wireless device 120*a*. Say that the channel estimation for slot 17, based on the reference signal in TDD uplink slot index 7, is X and the channel estimation for slot 17, based on the reference signal in TDD uplink slot index 17, is Y, and $|Y-X|<0$. There has thus been a degradation of the radio channel estimation corresponding to the difference between X and Y, i.e. there is a delta=$|Y-X|$ between slots 7 and 17, i.e. during 9 TDD slots. Without any other knowledge, a reasonable simplification is to assume that the degradation is linear over said 9 TDD slots. Said delta, or a provided, such as computed, measure of relative degradation, e.g. delta/Y, may be used as an indicator or measure of a degree or level of degradation for the wireless device 120*a* over the 9 TDD slots. The relative degradation is best to use when degradation between wireless devices are to be compared. To be independent on the number of time slots between channel estimations used for different wireless device, i.e. if it is not always the same, such as 9 TDD slots as in the present example, the delta and/or measure of relative degradation may be provided "per TDD slot" so that degradation between wireless devices still can be compared. If a delta and/or measure of relative degradation is provided for all wireless devices, e.g. also for the wireless devices 120*b-c*, using channel estimates for these wireless devices, the measures of degradation can be used for comparison between the wireless devices and thereby get indication of which wireless device is likely subject to the greatest and/or most rapid degradation of its channel estimation. The wireless devices 120*a-c* may be ranked accordingly.

One can say that the higher degradation that the delta, or measure of relative degradation resulting from the delta, indicates for a wireless device among said wireless devices 120*a-c*, the greater degradation of the channel estimation accuracy is predicted for that wireless device.

The idea behind these embodiments may be explained as, per wireless device, finding out about, such as estimating, a channel estimation accuracy degradation over a time period and assume that a degradation trend the degradation indicates is valid, or at least is indicative of continued degradation, also during a time thereafter, e.g. until a new measure of relative degradation can be provided based on reference signals in a next TDD frame.

An advantage with these embodiments is that that the prediction can use channel estimations that typically are already available, e.g. in a radio network node, such as through CSI, typically resulting in an efficient and robust implementation that can respond and adapt to changes relatively fast.

It should be noted that some existing estimation and/or prediction algorithm regarding radio channels provide, or can be made to provide, a channel knowledge error per TDD slot, corresponding to an estimate or prediction of an error associated with channel estimation for a TDD slot, i.e. relating to how incorrect a provided channel estimate is for the TDD slot. For TDD downlink slots between TDD uplink slots with reference signals, such channel knowledge error can be considered to be based on prediction since there is no signal there to estimate the channel. If such estimation and/or prediction algorithm is available, e.g. a Kalman filer based algorithm, it can be utilized to predict the radio channel estimation accuracy degradations, and/or provide the predictions of the channel estimation accuracy degradations, for embodiments herein.

In practice, the error metric from such algorithm may be in different forms depending on the actual channel estimation and/or prediction algorithm.

The error metric from such algorithm, and also metric of predictions according to embodiments herein, may e.g. be in the form of mean square error (MSE). The error is in this case by comparison of the estimated and/or predicted channel to a more accurately estimate of the same channel, which can be used as a "stand-in" for the true channel, corresponding to a "quasi-true" channel. The quasi-true channel could for example be a smooth version of the estimated channels over time and frequency.

In some embodiments, an error metric, that may be in the form of MSE, used for prediction according to embodiments herein, is provided by a Kalman filter based prediction algorithm.

In some embodiments, the predicted radio channel estimation accuracy degradation of Action 504 is based on a difference between a first channel estimation error for a first of said TDD downlink slots, e.g. a first of the TDD downlink slots 4*a*, and a second channel estimation error for another, second, of the TDD downlink slots e.g. a second of the TDD downlink slots 4*a*. For example the first and last of the TDD downlink slots 4*a*. Said channel estimation errors may be obtained from a channel estimation and prediction algorithm being used, e.g. a Kalman filter based channel estimation and prediction algorithm.

In some embodiments, the predicted radio channel estimation accuracy degradation of Action 504 is based on the obtained speed, or speeds, in Action 503. The speed used for a wireless device should be relevant for said time interval, i.e. the time interval between where the channel can be estimated based on the reference signals in the TDD uplink slots, i.e. be relevant for said TDD downlink slots where it is of interest to predict channel estimation degradation. The higher the speed for a wireless device, e.g. the wireless device 120*a*, among the wireless devices 120*a-c*, the greater degradation of the channel estimation accuracy is predicted for that wireless device. These embodiments are thus based on the correlation mentioned above between speed and the degradation of channel estimation accuracy. How the correlation looks like may be determined from historical data and/or measurements and it may e.g. be a look-up table or similar, or some function may be formed, that provides a measure of predicted degradation based on speed, or it may simply be assumed that the speed itself indicates degradation, so that if e.g. the wireless device 120*a* has a greater speed than the other wireless devices 120*ab-c*, it has also greater degradation of the channel estimation accuracy than wireless devices 120*b-c*.

The speed should be a speed that is current for the wireless device, and/or relevant, or can be assumed to be most likely relevant, for said time interval and the TDD downlink slots between the TDD uplink slots with the reference signals used for the channel estimation. For example, an obtained speed or measure of speed can be considered relevant during a certain, e.g. predetermined, time period, that may have been predetermined based on statistics. The time period and statistics may be based on that a wireless device in practice does not change its speed very quickly. Hence, a measure or estimation of speed can be considered valid during also a time period after it was obtained.

In other words, the obtained speed being relevant for said TDD downlink slots may be assumed, or be determined based on when, e.g. how long ago, the wireless device was travelling with the speed resulting in the obtained speed. A predefined and/or predetermined time threshold may be used. If the obtained speed, e.g. measure and/or information on the speed relates to a speed the wireless device had sooner than indicated by said time threshold, the speed according to said measure and/or information on the speed is considered relevant. This can be assured to always be the case by obtaining current speed, i.e. obtaining new measures and/or estimates of current speed, so frequently and often that speed used for the prediction of radio channel estimation accuracy degradation will always be considered relevant.

An advantage of using speed is that it likely is the best measure to capture and predict degradation that depends on speed, and thus is very suitable if it is known that the main cause behind degradation is the speed of wireless devices It can also facilitate implementation outside of a radio network node if the information on speed is easier and/or faster available there, e.g. in case scheduling is fully or partly made outside the radio network node, e.g. as a cloud based service or similar.

In some embodiments, the degradation of the radio channel estimation accuracy for respective one of said wireless devices 120*a-c* is additionally predicted based on one or more channel conditions for the wireless device. That is, based on channel condition(s) of each wireless device that the degradation of the radio channel estimation accuracy is predicted for. The channel conditions may comprise one or more of the following: signal-to-interference-plus-noise ratio (SINR) and whether or not the channel is a line of sight (LOS) channel. These embodiments are further discussed separate below.

Action 505

There may be performed a ranking of said multiple wireless devices 120*a-c* based on the predictions of the degradation of the radio channel estimation accuracy for one or more of said wireless devices 120*a-c*, i.e. the prediction in Action 504. The ranking is made so that the ranking for each ranked wireless device indicates its predicted degradation.

In some embodiments, the ranking is based on a relative order among the wireless devices based on the magnitudes of their predicted degradation in relation to each other. That is, the ranking may reflect an order among the wireless devices that may be determined by the size of their predicted degradation of radio channel estimation accuracy and may indicate or identify which of the wireless devices has or have the greatest predicted degradation, the second greatest predicted degradation, etc.

In some embodiments, where differences as mentioned above are provided, a wireless device with the greatest difference may get the highest ranking and thereby e.g. be scheduled in a DL slot that follows upon an UL slot, the wireless device with the second highest difference may get the second highest ranking, etc.

In some embodiments, where speed is used as mentioned above, a wireless device with the greatest speed may get the highest ranking, the wireless device with the second highest difference may get the second highest ranking, etc.

In some embodiments, the ranking is based on ranking thresholds where the highest of said ranking thresholds that the predicted degradation for a wireless device is above determines the ranking for this wireless device. For example, there may be N thresholds, T1 . . . TN. The ranking thresholds may be predefined or predetermined. An advantage is that wireless device can get the same ranking if they are close in predicted degradation. This takes into account that the predictions are typically not so accurate that small differences can be assumed to correspond to actual differences. It also means that there can be a predetermined, i.e. known, number of possible rankings, e.g. ranking levels, which facilitates for scheduling compared to if instead the ranking corresponds to an order of the wireless devices and there thus would be ranking numbers that vary depending on how many wireless devices are involved.

The ranking thus facilitates scheduling, see Action 506, that thereby can be based on the ranking instead of more directly on the predictions of the degradation of the radio channel estimation accuracy. How the ranking is accomplished can change without affecting the scheduling that thereby may act on ranking independent on how the ranking was accomplished. Ranking e.g. makes it possible to take into account degradation predicted based on difference factors, e.g. by weighting them, to result in a common ranking, e.g. prediction based on said difference and speed mentioned above under Action 504.

Action 506

The radio network node 110 schedules said multiple wireless devices 120*a-c* based on the predicted radio channel estimation accuracy degradation for respective wireless devices 120*a-c*, i.e. based on outcome from Action 504. The scheduling may be performed such that the greater the predicted degradation of radio channel estimation accuracy is for a wireless device, e.g. the wireless device 120*a,* among said wireless devices 120*a-c*, the greater influence is applied for scheduling the wireless device 120*a* early among said TDD downlink slots 4.

As used herein, early among the TDD downlink slots, should be understood to mean sooner after the last TDD uplink slot with reference signal, since the TDD downlink slots are between such TDD uplink slots.

As indicated above, already in conventional scheduling, without application of embodiments herein, there is applied influence on which slots and resources that wireless devices will be scheduled in, e.g. which TDD downlink slots. Embodiments here may add influence for earlier scheduling in addition to this and that increases with increased predicted channel estimation accuracy degradation. As a result, a wireless device will have higher probability to be scheduled within the first one or more slots after one of said TDD uplink slots with reference signal receptions when it has greater predicted channel estimation accuracy degradation compared to if the same wireless devices would have a lower predicted channel estimation accuracy degradation, and also compared to a case without embodiments herein. As a result, the channel estimations, e.g. in the form of CSI, will be less outdated for wireless devices where the outdating else could or would be most problematic, as explained above when the problem was discussed. Thereby serving of these wireless devices using MU-MIMO and beamforming is supported and facilitated thanks to embodiments herein.

Another way of describing the scheduling is that scheduling of wireless devices with greater predicted degradation of their channel estimation accuracy are influenced will get an receive an increased prioritized for scheduling earlier among the TDD downlink slots than those with lower predicted degradation of their channel estimation accuracy. It could also be described as that scheduling of the wireless devices is increasingly influenced with increased predicted channel estimation accuracy degradation so that those with greater predicted channel estimation accuracy degradation than others are more influenced in the scheduling to be scheduled earlier in time, i.e. earlier among the TDD downlink slots.

When ranking as in action 505 has been performed, the scheduling may be based on the predicted radio channel estimation accuracy degradation through the ranking, i.e. the scheduling may be based on the ranking.

The scheduling may apply weighting based on the predicted channel degradation or ranking, possibly together with and/or in relation to weighting also of other factors affecting how wireless devices are prioritized for early scheduling.

Scheduling is typically based on multiple parameters and values thereof that determine when to schedule said wireless devices 120*a-c* among said TDD downlink slots 4. In embodiments where this is the case, the predicted radio channel estimation accuracy degradation may influence only one or some of said multiple parameters and/or values thereof. The predicted radio channel estimation accuracy degradations for the wireless device 120*a-c* are thus not alone having influence on when the wireless devices will be scheduled among said TDD downlink slots 4.

In some embodiments, wireless devices are scheduled in different resources by falling ranking, i.e. the wireless devices with the highest ranking are scheduled within a first or earliest of the TDD downlink slots 4, wireless devices with the second highest ranking are scheduled in a second, e.g. second earliest, of the TDD downlink slots 4, etc.

In some embodiments, as indicated above, the predictions and/or ranking according to embodiments herein is one out of multiple scheduling criteria used. For example, a set of wireless devices to potentially be scheduled within the same TDD downlink slot could be given a score S reflecting a spatial compatibility of these wireless devices, where e.g. a high S may correspond to good spatial compatibility. Such a score could e.g. be based on the ratio between an expected sum-rate the wireless devices would have and/or experience with MU-MIMO compared to the expected sum-rate they would have if they were multiplexed over the same resources. The scheduling of respective wireless device may then be based on the spatial compatibility score S and the sum of the ranking of the wireless devices through a weighted sum, for example:

$$w_S S + w_R R,$$

where $w_S$ and $w_R$ are positive real valued scalars.

To accommodate for more criteria, the weighting may take and arbitrary number N scores $S_1, \ldots, S_i$ into account through for example $$w_R R + \sum_{i=1}^{N} w_i S_i,$$

where $w_i$, i=1, . . . , N are positive real valued scalars.

In addition to the above mentioned compatibility score, the values $S_1, \ldots, S_i$ could represent other relevant scheduling performance metrics such as SINR, speed, coherence bandwidth, etc.

Action 507

The radio network node 110 serves the wireless devices 120*a-c* based on the scheduling, i.e. the scheduling made, or performed, in Action 505. The serving as such may be as conventionally. It is through the scheduling the wireless devices with greater predicted degradation will be influenced to be served more often in TDD downlink slots that occur first or early among the TDD downlink slots 4 than else would be the case.

Under Action 504 it was mentioned two different ways of providing estimation of the downlink channel based on uplink channel measurements and uplink channel estimates. These two ways will now be explained in some further detail.

Assume, for the example, a very simple system with 1 UL slot and 2 consecutive DL slots, where the channel for the 3 slots ia denoted H1, H2 and H3, respectively. In the UL slot a reference signal is received, measured and a channel estimate X for the uplink channel is provided. The channel estimation error for the UL slot can then be expressed as H1-X.

Further, the two ways to use X to estimate the channel for the DL slots are:

1) The channel estimate X is used as a prediction for all DL slots, i.e. the UL channel estimate is used for the DL slots. then a) the channel estimation for the first DL slot is X and the channel estimation error for the first downlink slot is H2-X, and b) the channel estimation for the second DL slot is X and the channel estimation error for the second downlink slot is H3-X.

There is a degradation of the channel estimation accuracy if $|H3-X|>|H2-X|$. This will typically be the case with a moving wireless device and with greater degradation with greater speed.

2) If there is some knowledge of how the radio channel will or likely will change over time, a model of the radio channel can be made and be used to predict H2 and H3 based on X. For example, a very simple model could be to assume that the channel at a time t, i.e. H(t), depends on the channel at time t-1, i.e. H(t−1), so that H(t)=a*H (t−1), where a is a complex scalar. With assumption that this model is used for predictions for the DL slots, i.e. to provide channel estimations for the DL slots, then:

a) the channel estimation for the first DL slot is aX and the channel estimation error for the first downlink slot is H2−aX, and b) the channel estimation for the second DL slot is $a^2$*X and the channel estimation error for the first downlink slot is H3−$a^2$*X.

Also here this will typically be the case with a moving wireless device and with greater degradation with greater speed.

Note that if the model is effective and useful, then $|H3-X|>|H3-a^2*X|$ and $|H2-X|>|H2-aX|$, i.e. the channel estimates for the DL slots will be better with the model, but there can nevertheless be channel estimation accuracy degradation and negative impact from that.

Figure 6:
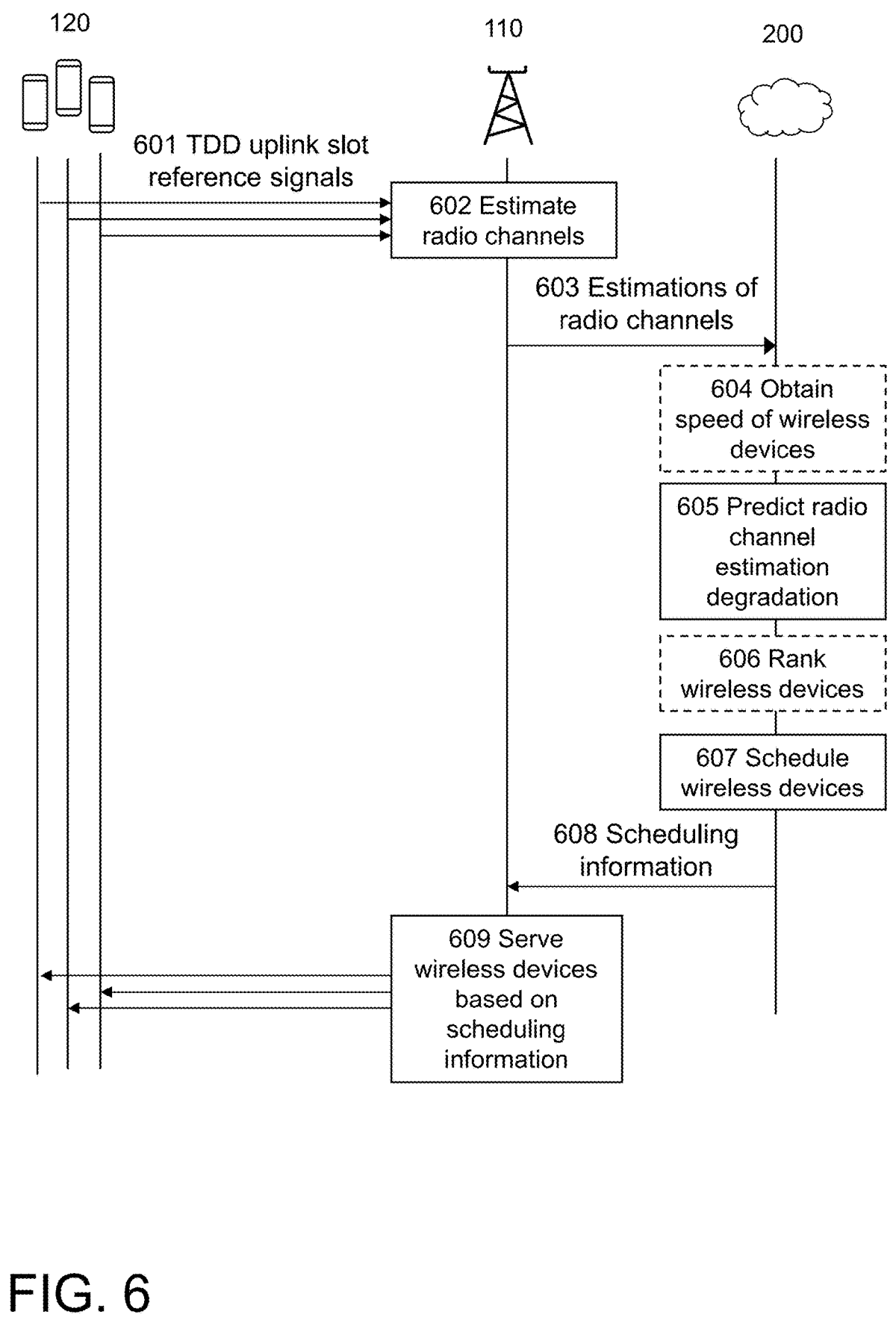

FIG. 6 is another combined signalling diagram and flowchart for describing and discussing some examples and embodiments herein and related actions. The actions in the following and as illustrated in the figure and example are involving several nodes and action more specific for embodiments herein are performed by other node(s) than the radio network node 110 as in the example of FIG. 5. More specifically, actions 604-607 are exemplified as being performed by the external network 200, e.g. corresponding to a computer cloud where the actions herein may be performed as a cloud service, which also may be the case for scheduling in general. Alternatively the action could be performed by another network node of the wireless communication network, e.g. the core network node 130 or by a single external node, e.g. the externa network node 201, such as server that performs actions of embodiments herein, and e.g. scheduling in general, as a service to the wireless communication network 100.

The actions may be part of a method for serving or supporting serving, by the radio network node 110, of multiple wireless devices, in the present example exemplified by the wireless devices 120*a-c*. As already indicated above and in the example of FIG. 5, the serving is performed using TDD over a frequency carrier. As also indicated above, just as in the prior art, the serving radio network node 110 is configured to, for respective wireless device 120*a-c*, estimate a downlink radio channel of the wireless device based on reference signals transmitted by the wireless device. The reference signals may thus be as in FIG. 2, i.e. in TDD uplink slots with TDD downlink slots therebetween etc. as described above for FIG. 5.

The actions below may be taken in any suitable order and/or be carried out fully or partly overlapping in time when this is possible and suitable.

To avoid repeating of information that has already been disclosed above in relation to FIG. 5, information that may be the same is excluded in the following. Focus is instead on the differences. The skilled will realize which information that may be the same as described above for FIG. 5, and what basic adaptation of the information, if any, may be needed for the information to be applied and be suitable to a context as in FIG. 6.

Action 601

This action may the same and/or correspond to Action 501.

Action 602

This action may the same and/or correspond to Action 502.

Action 603

The radio network node 110 sends the estimations, estimated under Action 602 to the externa network 200 that receives these. Alternatively the radio network node 110 may send, and the external network 200 may receive, information identifying the estimations, so that the external network can retrieve and use the estimations.

Action 604

This action may correspond to Action 503 but performed by the external network 200 instead of the radio network node 110.

Action 605

This action may correspond to Action 504 but performed by the external network 200 instead of the radio network node 110.

Action 606

This action may correspond to Action 505 but performed by the external network 200 instead of the radio network node 110.

Action 607

This action may correspond to Action 506 but performed by the external network 200 instead of the radio network node 110.

Action 608

Scheduling information, i.e. the result from the performed scheduling in Action 607 and/or that is identifying the performed scheduling in Action 607, is sent to the radio network node 110 that receives this information. It is implied that the scheduling information is provided and sent in a format suitable for and usable by the radio network node 110.

The scheduling information may state in which time-frequency resources each wireless device shall be served or it may only state within which slots the wireless devices shall be served. In the latter case the scheduling information may further include whether or not a wireless device is to be served using MU-MIMO or SU-MIMO, while in the former case this is implicitly included as the radio network node will then serve all wireless devices scheduled within the same time-frequency resources jointly with MU-MIMO and only wireless devices that are “alone” in their time-frequency will be served by SU-MIMO.

In the case that the scheduling information include the time-frequency resources for serving each wireless device, Action 609 may be performed directly.

In the case that the scheduling information include only in which time slots the wireless device will be served, the radio network node may make further scheduling decisions, such as whether or not a wireless device shall be served by MU-MIMO or SU-MIMO, if that information is not provided, and which wireless devices to serve on the different PRBs.

Action 609

The radio network node 110 serves the wireless device 120*a-b* based on the received scheduling information. This action may thus correspond to Action 507.

With reference to FIGS. 5 and 6, it should be realized that yet further embodiments can be contemplated, where e.g. the scheduling in Action 506 and Action 607 is performed by another node or nodes. For example, if the radio network node 110 performs actions as in FIG. 5 except from Action 506 it may send information on the predictions and/or the ranking it has performed, comprised in or corresponding to channel estimation accuracy degradation information, together with other information to be used for scheduling, to said other node(s), e.g. the external node 201 or external network 200, that receives, i.e. obtains, this information and then performs the scheduling as in Action 506 or Acton 607 based on the information. The other node(s) may then send resulting scheduling information, similar as in Action 608, to the radio network node 110.

In some embodiments, the radio network node 110 may perform actions 602-606, but where Action 603 obviously is not needed to be performed. The information on the ranks, which can be very small, is then sent to the further network 200 that receives it and use the information on ranks in the scheduling. This can be beneficial since there is likely less information to transfer regarding information on ranks compared to sending estimations as in Action 603. Ranks are typically a lot easier to send as a small amount of data than channel estimates, and especially if it is with high granularity.

In some embodiments, channel measurements that are made as part of Action 602 and used for the channel estimations are made by the further network 200 that instead of the estimation receives the channel measurements from the radio network node 110 and then make the estimations as in Action 602 but based on the received channel measurements.

A solution based on embodiments herein as described above may thus result in scheduling that take into account predictions of channel estimation accuracy degradation of users, i.e. of wireless devices, regarding TDD downlink slots in between SRS receptions, i.e. between TDD uplink slots with reference signals. The predictions of channel estimation accuracy degradation can be considered corresponding to an error in channel knowledge that may be based on channel estimations made on said reference signals.

As should be understood from the above discussion in relation to FIG. 5, scheduling based on embodiments herein may schedule wireless devices with high ranking in the first a few TDD downlink slots right after a TDD uplink slot with reference signal, e.g. SRS, with a high probability or higher probability than else would be the case.

In some embodiments, already indicated above, the wireless devices are given a ranking based on their speed and channel condition. The speed can e.g. be estimated based on the doppler spectrum estimation. The channel conditions can for example be whether or not the channel is a LOS and/or how high the SiNR is. The combination of speed and channel conditions can be translated into an index that represents channel estimation, or CSI, accuracy through a mapping scheme such as a look-up table or similar. The look-up table could for example be based on statistics from past channel estimates with the estimation algorithm used.

In some embodiments, the wireless device user with the lowest CSI accuracy index gets the highest ranking, the wireless device with the second lowest CSI accuracy index will get the second highest ranking, etc. In some embodiments thresholds as above are used for the ranking, e.g. threshold T1 . . . TN. All wireless devices users with a CSI accuracy index below threshold T1 may get the highest ranking, all users with a CSI accuracy index below threshold T2 may get the second highest ranking, etc.

Figure 7:
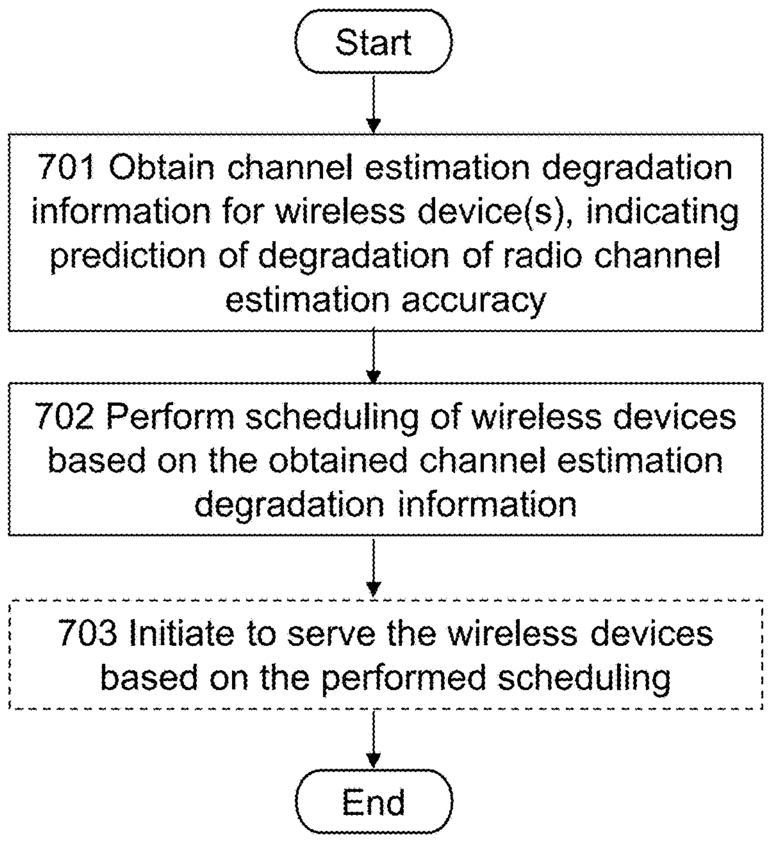
FIG. 7 is a flowchart schematically illustrating embodiments of a method according to embodiments herein.

FIG. 7 is a flowchart schematically illustrating embodiments of a method according to embodiments herein and based on the above discussed examples and embodiments.

The method is for supporting serving of multiple wireless devices by a radio network node of a wireless communication network. In the following said multiple wireless devices may be exemplified by the wireless devices 120*a-c,* said radio network node may be exemplified by the radio network node 110 and said wireless communication network may be exemplified by the wireless communication network 100. Said serving is performed using Time Division Duplex, TDD, over a frequency carrier. The radio network node 110 is configured to, for each of said wireless devices, estimate a downlink radio channel of the wireless device, e.g. the wireless device 120*a,* based on reference signals transmitted by the wireless device 120*a* in TDD uplink slots with TDD downlink slots therebetween. In the following the TDD uplink slots may be exemplified, with reference to FIG. 2, by the TDD uplink slots 2, i.e. 2*a* and 2*b,* and the TDD downlink slots may be exemplified by the TDD downlink slots 4.

Said one or more network nodes performing the method may be one or more of the following: a radio network node, e.g. the radio network node 110, one or more network nodes of the wireless communication network 100, e.g. the core network node 130, one or more network nodes that are external from but communicatively connected to wireless communication network 100, e.g. the external network node 201 and/or the external network 200.

The actions below that may form the method may be taken in any suitable order and/or be carried out fully or partly overlapping in time when this is possible and suitable.

Action 701

Said one or more network nodes obtain channel estimation accuracy degradation information for at least one of said multiple wireless devices 120*a-c*. Said channel estimation accuracy degradation information for respective one of said at least one wireless devices 120*a-c* indicates a prediction of a degradation of radio channel estimation accuracy for the wireless device, e.g. for the wireless device 120*a,* during TDD downlink slots (4). For example, the degradation relates to a time interval between said TDD uplink slots 2 where said TDD downlink slots 4 are located.

In some embodiments, the degradation of the radio channel estimation accuracy for respective one of said wireless devices 120*a-c* may be predicted based on a difference between uplink channel estimates for separate TDD uplink slots 2 with said reference signals. The greater degradation over time indicated by the difference for a wireless device, e.g. the wireless device 120*a,* among said wireless devices 120*a-c,* the greater degradation of the channel estimation accuracy is predicted for that wireless device. The separate TDD uplink slots are preferably consecutive TDD uplink slots. Degradation over time may be per TDD slot or TDD slots, e.g. over the TDD slots between the TDD uplink slots with the reference signals.

In some embodiments, the degradation of the radio channel estimation accuracy for respective one of said wireless devices 120*a-c* is predicted based on a difference between a first channel estimation error for a first of said TDD downlink slots 4 and a second channel estimation error for another, second, of said TDD downlink slots 4. For example, said two TDD downlink slots may be the first and last, i.e. earliest and latest, of the sequence of consecutive TDD downlink slots 4. Said channel estimation errors may be obtained from a channel estimation and prediction algorithm already in use and that may be a conventional one that can provide channel estimation errors. The channel estimation and prediction algorithm may e.g. be a Kalman filter based channel estimation and prediction algorithm.

An advantage with these embodiments as already indicated above, is that that the prediction can use channel estimations or channel estimation errors that may be already available, e.g. in a radio network node, and/or from the algorithm in use. This can result in efficient and robust implementation that can respond and adapt to changes relatively fast.

In some embodiments, the degradation of the radio channel estimation accuracy for respective one of said wireless devices 120*a-c* is predicted based on a speed of the wireless device. The higher the speed for a wireless device, e.g. the wireless device 120*a,* the greater degradation of the channel estimation accuracy is predicted for that wireless device.

As already mentioned above, the speed may be a measure or estimate of current, i.e. present, speed. Information on the speed can be obtained in several different ways, e.g. as indicated and discussed above.

An advantage these embodiments is that speed may be the best measure that captures and predicts how a channel estimation accuracy of the uplink radio channel at a certain point in time will degrade, i.e deteriorate, as representative of the downlink radio channel, i.e. degradation that mainly may be due to speed or where speed is a major contributor to the degradation. Speed can also facilitate implementation of embodiments performed outside of a radio network node, e.g. the radio network node 110, if e.g. information on speed is easier and/or faster available to another node. This could e.g. be the case for embodiments where scheduling is fully or partly made outside the radio network node 110 and e.g. provided as a cloud based service or similar.

In some embodiments, the degradation of the radio channel estimation accuracy for respective one of said wireless devices 120*a-c* is additionally predicted based on one or more channel conditions for that wireless device. As already mentioned above, said channel conditions may relate to or comprise one or more of the following: SINR and whether or not the channel is a line of sight, LOS, channel.

In some embodiments, the channel estimation accuracy degradation information comprises a ranking of said multiple wireless devices 120*a-c* based on said prediction of the degradation of the radio channel estimation accuracy for one or more of said wireless devices 120*a-c.* For each ranked wireless device the ranking indicates its predicted degradation.

The ranking facilitates for scheduling and makes it possible to take into account degradation predicted based on difference factors, e.g. by weighting them, to result in a common ranking. Ranking may also facilitate processing separated from the scheduling, which allows for greater flexibility. How the ranking is accomplished can change without affecting the scheduling that thereby may act on ranking independent on how the ranking was accomplished.

In some embodiments, the ranking is based on a relative order among the wireless devices based on the sizes of their predicted degradation in relation to each other.

In some embodiments, the ranking is based on ranking thresholds where the highest of said ranking thresholds that the predicted degradation for a wireless device, e.g. the wireless device 120*a,* is above, i.e. is worser than, determines the ranking for that wireless device. The ranking thresholds may be predefined or predetermined. An advantage is that wireless device can get the same ranking if their predicted degradations are about the same. This takes into account that the predictions are typically not so accurate that small differences can be assumed to correspond to actual differences. It also means that there can be a predetermined, i.e. known, number of possible rankings, e.g. ranking levels, which facilitates for scheduling compared to if instead the ranking corresponds to an order of the wireless devices and thus ranking numbers can vary depending on how many wireless devices are involved.

The present action may fully or partly correspond to Actions 502-505 and Actions 603-606.

Thus, in some embodiments, when e.g. said one or more nodes that perform the present action is the radio network node 110, obtain channel estimation accuracy degradation information as in the present action may correspond to that the radio network node 110 performs Actions 502-505 or at least performs Actions 502, 504, i.e. estimates the radio channels and predicts the radio channel estimation accuracy degradation as described above for said actions.

In other embodiments, when e.g. said one or more nodes is the external network 200, external node 200, obtain the channel estimation accuracy degradation information as in the present action may correspond to that the external network 200 performs Actions 603-606 or at least Actions 603, 605.

In yet other embodiments not shown in any figure, when e.g. said one or more nodes is the external network 200, obtain the channel estimation accuracy degradation information as in the present action may correspond to that the external network 200 receives channel estimation accuracy degradation information from the radio network node 110 based on, and/or comprising results from, that the radio network node 110 performed actions corresponding to Actions 502-505 or at least Actions 504, 505.

Action 702

Said one or more network nodes perform scheduling of said multiple wireless devices 120*a*-*c* in said TDD downlink slots based on the obtained channel estimation accuracy degradation information. The scheduling is performed such that the greater the predicted degradation of radio channel estimation accuracy is for a wireless device, e.g. the wireless device 120*a*, among said wireless devices 120*a*-*c*, the greater influence is applied for scheduling this wireless device, e.g. the wireless device 120*a*, early among said TDD downlink slots 4. As already mentioned above, an alternative view may be that influence is applied that contributes to or has an effect of causing scheduling earlier among the TDD downlink slots and that this influence increases with increased predicted channel estimation accuracy degradation.

As a result, a wireless device will have higher probability to be scheduled within the first one or more slots after one of said TDD uplink slots with reference signal receptions when it's predicted channel estimation accuracy degradation exceeds those of other wireless devices. A consequence is that the channel estimations, e.g. in the form of CSI, will be less outdated for wireless devices where outdating else could or would be most problematic, as explained above when the problem was discussed. Thereby serving of these wireless devices using MU-MIMO and beamforming is supported and facilitated thanks to embodiments herein.

Another way of describing the scheduling is that scheduling of wireless devices with high predicted degradation of their channel estimation accuracy is prioritized for scheduling earlier among the TDD downlink slots than other UEs with low predicted degradation of their channel estimation accuracy. It could also be described as that scheduling of the wireless devices is increasingly influenced with increased predicted channel estimation accuracy degradation so that those with greater predicted channel estimation accuracy degradation than others are more likely to be scheduled among the first TDD downlink slots in a sequence of DL slots that have no UL slot in between.

In some embodiments, said scheduling is based on multiple parameters and values thereof that determine when to schedule said wireless devices 120*a*-*c* among said TDD downlink slots 4. The degradation according to the degradation information influences only one or some of said multiple parameters and values thereof. As a result, said degradation information has only partial influence on when to schedule said wireless devices 120*a*-*c* among said TDD downlink slots 4.

The present action may fully or partly correspond to Action 506 and Action 607.

Action 703

Said one or more network nodes may initiate to serve, by the radio network node 110, said multiple wireless devices 120*a*-*c* based on, such as using, the performed scheduling, i.e. the result from Action 702.

The present action may fully or partly correspond to Action 507 and Action 609.

When the network node(s) performing the present action is also performing the serving, such as when the method or present action is performed by the radio network node 110 as in FIG. 5, initiate to serve is part of, or comprised, in the performed serving. This since serving necessarily means that the node(s) performing the serving has started it, i.e. initiated the serving.

For embodiments where the network node(s) performing the present action is not performing the serving, such as when the method or present action is performed by the external network 200, initiate to serve may instead be that the external network 200 triggers, e.g. send a command or information, that initiates the serving, e.g. that it sends scheduling information to the radio network node 110 as in Action 608 of FIG. 6.

Figure 8:
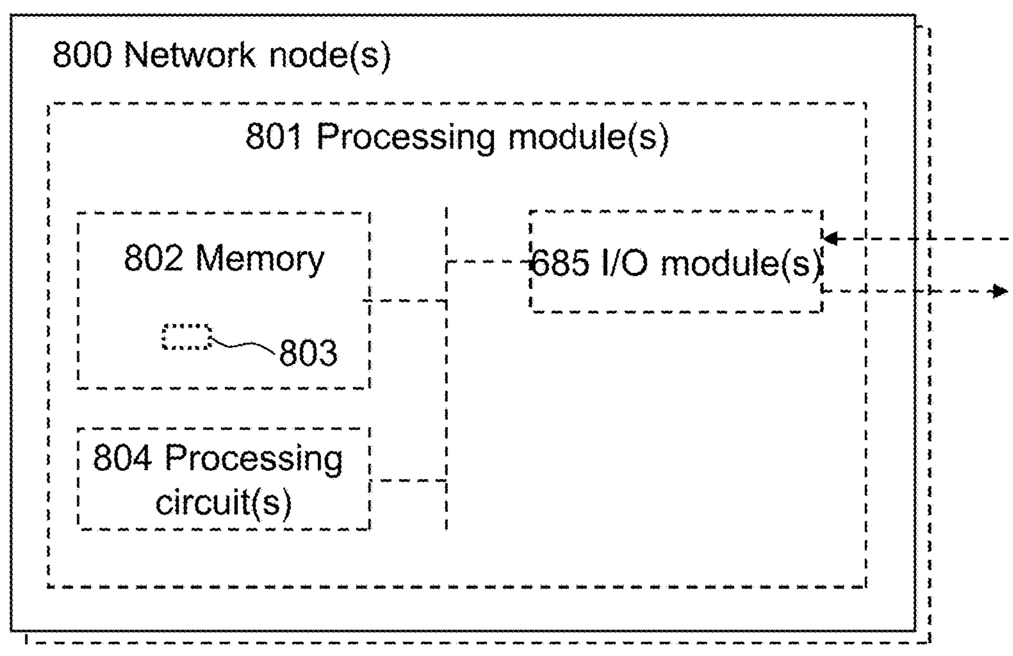
FIG. 8 is a schematic block diagram for illustrating embodiments of how one or more network nodes may be configured to perform the method and actions discussed in connection with FIG. 7.

FIG. 8 is a schematic block diagram for illustrating embodiments of how one or more network nodes 800 may be configured to perform the method and actions discussed above in connection with FIG. 7. Hence, said network node(s) 800 are for supporting serving of the multiple wireless devices 120*a*-*c* by the radio network node 110 of the wireless communication network 100. The serving to be performed using TDD over a frequency carrier and the radio network node being configured to, for each of said wireless devices 120*a*-*c*, estimate a downlink radio channel of the wireless device based on reference signals transmitted by the wireless device in TDD uplink slots 2 with TDD downlink slots 4 therebetween.

The network node(s) 800 may comprise processing module(s) 801, such as a means, one or more hardware modules, including e.g. one or more processors, and/or one or more software modules for performing said method and/or actions.

The network node(s) 800 may further comprise memory 802 that may comprise, such as contain or store, computer program(s) 803. The computer program(s) 803 comprises 'instructions' or 'code' directly or indirectly executable by the network node(s) 800 to perform said method and/or actions. The memory 802 may comprise one or more memory units and may further be arranged to store data, such as configurations and/or applications involved in or for performing functions and actions of embodiments herein.

Moreover, the network node(s) 800 may comprise processor(s) 804, i.e. one or more processors, as exemplifying hardware module(s) and may comprise or correspond to one or more processing circuits. In some embodiments, the processing module(s) 801 may comprise, e.g. 'be embodied in the form of' or 'realized by' processor(s) 804. In these embodiments, the memory 802 may comprise the computer program 803 executable by the processor(s) 804, whereby the network node(s) 800 is operative, or configured, to perform said method and/or actions.

Typically the network node(s) 800, e.g. the processing module(s) 801, comprises Input/Output (I/O) module(s) 805, configured to be involved in, e.g. by performing, any communication to and/or from other network nodes and/or units and/or devices, such as sending and/or receiving information to and/or from other network nodes. The I/O module(s) 805 may be exemplified by obtaining, e.g. receiving, module(s) and/or providing, e.g. sending, module(s), when applicable.

Further, in some embodiments, the network node(s) 800, e.g. the processing module(s) 801, comprises one or more of an performing module(s), scheduling module(s), initiating module(s), serving module(s), as exemplifying hardware and/or software module(s) for carrying out actions of embodiments herein. These modules may be fully or partly implemented by the processor(s) 804.

Hence:

The network node(s) 800, and/or the processing module(s) 801, and/or the processor(s) 804, and/or the I/O module(s) 805, and/or the obtaining module(s) are operative, or configured, to obtain said channel estimation accuracy degradation information.

The network node(s) 400, and/or the processing module(s) 801, and/or the processor(s) 804, and/or the I/O module(s) 805, and/or the performing module(s), and/or the scheduling module(s), are operative, or configured, to perform said scheduling of said multiple wireless devices in the TDD downlink slots 4 based on the obtained channel estimation accuracy degradation information.

The network node(s) 400, and/or the processing module(s) 801, and/or the processor(s) 804, and/or the initiating module(s), and/or serving module(s), may be operative, or configured, to serve or initiate to serve, by the radio network node 110, said multiple wireless devices 120*a-c* based on the performed scheduling.

Figure 9:
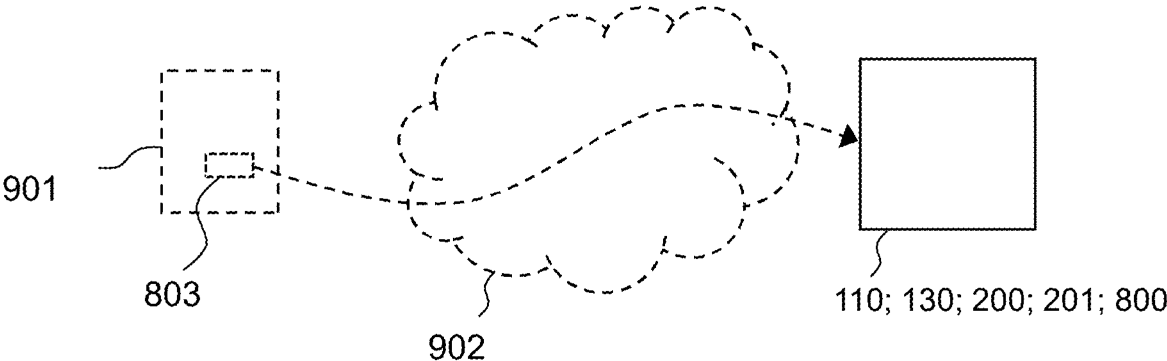
FIG. 9 is a schematic drawing illustrating some embodiments relating to computer program(s) and carriers thereof to cause one or more network nodes to perform the method and related actions discussed in connection with FIG. 7.

FIG. 9 is a schematic drawing illustrating some embodiments relating to computer program(s) and carriers thereof to cause said network node(s) 800 discussed above to perform said method and related actions. The computer program(s) may be the computer program 803 and comprises instructions that when executed by the processor(s) 804 and/or the processing module(s) 801 cause the network node(s) 800 to perform as described above. In some embodiments there is provided carrier(s), or more specifically data carrier(s), e.g. computer program product(s), comprising the computer program(s). Each carrier may be one of an electronic signal, an optical signal, a radio signal, and a computer readable storage medium, e.g. a computer readable storage medium or media 901 as schematically illustrated in the figure. The computer program(s) 803 may thus be stored on such computer readable storage medium 901. By carrier may be excluded a transitory, propagating signal and the data carrier may correspondingly be named non-transitory data carrier. Non-limiting examples of the data carrier(s) being computer readable storage medium or media is a memory card or a memory stick, a disc storage medium, or a mass storage device that typically is based on hard drive(s) or Solid State Drive(s) (SSD). The computer readable storage medium or media 901 may be used for storing data accessible over a computer network 902, e.g. the Internet or a Local Area Network (LAN). The computer program(s) 803 may furthermore be provided as pure computer program(s) or comprised in a file or files. The file or files may be stored on the computer readable storage medium or media 901 and e.g. available through download e.g. over the computer network 902 as indicated in the figure, e.g. via a server. The file or files may e.g. be executable files for direct or indirect download to and execution on said network node(s) 800 to make it or them perform as described above, e.g. by execution by the processor(s) 804. The file or files may also or alternatively be for intermediate download and compilation involving the same or another processor(s) to make them executable before further download and execution causing said network node(s) 800 to perform as described above.

Note that any processing module(s) and circuit(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make any node(s), device(s), apparatus(es), network(s), system(s), etc. to be configured to and/or to perform the above-described methods and actions.

Identification by any identifier herein may be implicit or explicit. The identification may be unique in a certain context, e.g. in the wireless communication network or at least in a relevant part or area thereof.

The term "network node" or simply "node" as used herein may as such refer to any type of node that may communicate with another node in and be comprised in a communication network, e.g. Internet Protocol (IP) network or wireless communication network. Further, such node may be or be comprised in a radio network node (described below) or any network node, which e.g. may communicate with a radio network node. Examples of such network nodes include any radio network node, a core network node, Operations & Maintenance (O&M), Operations Support Systems (OSS), Self-Organizing Network (SON) node, etc.

The term "radio network node" as may be used herein may as such refer to any type of network node for serving a wireless communication device, e.g. a so called User Equipment or UE, and/or that are connected to other network node(s) or network element(s) or any radio node from which a wireless communication device receives signals from. Examples of radio network nodes are Node B, Base Station (BS), Multi-Standard Radio (MSR) node such as MSR BS, eNB, eNodeB, gNB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless communication device", "wireless device", "user equipment" and "UE", as may be used herein, may as such refer to any type of wireless device arranged to communicate with a radio network node in a wireless, cellular and/or mobile communication system. Examples include: target devices, device to device UE, device for Machine Type of Communication (MTC), machine type UE or UE capable of machine to machine (M2M) communication, Personal Digital Assistant (PDA), tablet, mobile, terminals, smart phone, Laptop Embedded Equipment (LEE), Laptop Mounted Equipment (LME), Universal Serial Bus (USB) dongles etc.

While some terms are used frequently herein for convenience, or in the context of examples involving other a certain, e.g. 3GPP or other standard related, nomenclature, it must be appreciated that such term as such is non-limiting Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, random access memory (RAM) or the like. Furthermore, the memory may be an internal register memory of a processor.

Also note that any enumerating terminology such as first device or node, second device or node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may e.g. mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described preferred embodiments. Various alternatives, modifications and equivalents may be used. Therefore. the above embodiments should not be taken as limiting the scope of the present disclosure. which is defined by the appending claims.

The invention claimed is:

1. A method, performed by one or more network nodes, for supporting serving of multiple wireless devices by a radio network node of a wireless communication network, said serving to be performed using Time Division Duplex, TDD, over a frequency carrier, and wherein the radio network node is configured to, for each of said wireless devices, estimate a downlink radio channel of a wireless device based on reference signals transmitted by the wireless device in TDD uplink slots with TDD downlink slots therebetween, wherein the method comprises:

obtaining channel estimation accuracy degradation information for at least one of said multiple wireless devices, wherein said channel estimation accuracy degradation information for respective one of said at least one wireless devices indicates a prediction of a degradation of radio channel estimation accuracy for this wireless device during TDD downlink slots; and performing scheduling of said multiple wireless devices in said TDD downlink slots based on the obtained channel estimation accuracy degradation information, such that when the predicted degradation of radio channel estimation accuracy is greater for a wireless device among said wireless devices, greater influence is applied for scheduling the wireless device early among said TDD downlink slots.

2. The method as claimed in claim 1, wherein the method further comprises:

initiating to serve, by the radio network node, said multiple wireless devices based on the performed scheduling.

3. The method as claimed in claim 1, wherein the degradation of the radio channel estimation accuracy for respective one of said wireless devices is predicted based on a difference between uplink channel estimates for separate TDD uplink slots with said reference signals, wherein when degradation over time indicated by the difference is greater for the wireless device among said wireless devices, greater degradation of the channel estimation accuracy is predicted for that wireless device.

4. The method as claimed in claim 1, wherein the degradation of the radio channel estimation accuracy for respective one of said wireless devices is predicted based on a difference between a first channel estimation error for a first of said TDD downlink slots and a second channel estimation error for another, second, of said TDD downlink slots.

5. The method as claimed in claim 1, wherein the degradation of the radio channel estimation accuracy for respective one of said wireless devices is predicted based on a speed of the wireless device, wherein when the speed is higher for the wireless device, greater degradation of the channel estimation accuracy is predicted for that wireless device.

6. The method as claimed in claim 5, wherein the degradation of the radio channel estimation accuracy for respective one of said wireless devices is additionally predicted based on one or more channel conditions for the wireless device.

7. The method as claimed in claim 1, wherein the channel estimation accuracy degradation information comprises a ranking of said multiple wireless devices based on said prediction of the degradation of the radio channel estimation accuracy for one or more of said wireless devices, so that the ranking for each ranked wireless device indicates its predicted degradation.

8. The method as claimed in claim 7, wherein the ranking is based on a relative order among the wireless devices based on the sizes of their predicted degradation in relation to each other.

9. The method as claimed in claim 7, wherein the ranking is based on ranking thresholds where a highest of said ranking thresholds that a predicted degradation for a wireless device is above determines the ranking for that wireless device.

10. The method as claimed in claim 1, wherein said scheduling is based on multiple parameters and values thereof that determine when to schedule said wireless devices among said TDD downlink slots, wherein degradation according to the degradation information influences only one or some of said multiple parameters and values thereof, whereby said degradation information has only partial influence on when to schedule said wireless devices among said TDD downlink slots.

11. The method as claimed in claim 1, wherein said one or more network nodes performing the method are one or more of the following: the radio network node, one or more network nodes of the wireless communication network, one or more network nodes that are external from but communicatively connected to wireless communication network.

12. A non-transitory computer-readable medium storing thereon a computer program comprising instructions that when executed by one or more processors cause one or more network nodes to perform the method according to claim 1.

13. One or more network nodes for supporting serving of multiple wireless devices by a radio network node of a wireless communication network, said serving to be performed using Time Division Duplex, TDD, over a frequency carrier, and wherein the radio network node is configured to, for each of said wireless devices, estimate a downlink radio channel of a wireless device based on reference signals transmitted by the wireless device in TDD uplink slots with TDD downlink slots therebetween, wherein said one or more network nodes are configured to:

obtain channel estimation accuracy degradation information for at least one of said multiple wireless devices, wherein said channel estimation accuracy degradation information for respective one of said at least one wireless devices indicates a prediction of a degradation of radio channel estimation accuracy for this wireless device during TDD downlink slots, and perform scheduling of said multiple wireless devices in said TDD downlink slots based on the obtained channel estimation accuracy degradation information, such that when the predicted degradation of radio channel estimation accuracy is greater for a wireless device among said wireless devices, greater influence is applied for scheduling the wireless device early among said TDD downlink slots.

14. The one or more network nodes as claimed in claim 13, wherein said one or more network nodes are further configured to:

initiate to serve, by the radio network node, said multiple wireless devices based on the performed scheduling.

15. The one or more network nodes as claimed in claim 13, wherein the degradation of the radio channel estimation accuracy for respective one of said wireless devices is predicted based on a difference between uplink channel estimates for separate TDD uplink slots with said reference signals, wherein when degradation over time indicated by the difference is greater for a wireless device among said wireless devices, greater degradation of the channel estimation accuracy is predicted for that wireless device.

16. The one or more network nodes as claimed in claim 13, wherein the degradation of the radio channel estimation accuracy for respective one of said wireless devices is predicted based on a difference between a first channel estimation error for a first of said TDD downlink slots and a second channel estimation error for another, second, of said TDD downlink slots.

17. The one or more network nodes as claimed in claim 13, wherein the degradation of the radio channel estimation accuracy for respective one of said wireless devices is predicted based on a speed of the wireless device, wherein when the speed is higher for the wireless device, greater degradation of the channel estimation accuracy is predicted for that wireless device.

18. The one or more network nodes as claimed in claim 13, wherein the channel estimation accuracy degradation information comprises a ranking of said multiple wireless devices based on said prediction of the degradation of the radio channel estimation accuracy for one or more of said wireless devices, so that the ranking for each ranked wireless device indicates its predicted degradation.

19. The one or more network nodes as claimed in claim 13, wherein said scheduling is based on multiple parameters and values thereof that determine when to schedule said wireless devices among said TDD downlink slots, wherein degradation according to the degradation information influences only one or some of said multiple parameters and values thereof, whereby said degradation information has only partial influence on when to schedule said wireless devices among said TDD downlink slots.

20. The one or more network nodes as claimed in claim 13, wherein said one or more network nodes are one or more of the following: the radio network node, one or more network nodes of the wireless communication network, one or more network nodes that are external from but communicatively connected to wireless communication network.

* * * * *